US012754206B2

(12) United States Patent
Halama

(10) Patent No.: US 12,754,206 B2
(45) Date of Patent: Oct. 6, 2026

(54) AOM FREQUENCY SHIFTER TEST FIXTURE

(71) Applicant: ROSEMOUNT AEROSPACE, INC., Burnsville, MN (US)

(72) Inventor: Gary E. Halama, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 768 days.

(21) Appl. No.: 18/134,228

(22) Filed: Apr. 13, 2023

(65) Prior Publication Data

US 2024/0345128 A1 Oct. 17, 2024

(51) Int. Cl.

| | |
|---|---|
| ***G01S 17/58*** | (2006.01) |
| ***G01P 5/26*** | (2006.01) |
| ***G01P 21/02*** | (2006.01) |
| ***G01S 7/497*** | (2006.01) |

(52) U.S. Cl.

CPC .............. *G01P 21/025* (2013.01); *G01P 5/26* (2013.01); *G01S 7/497* (2013.01); *G01S 17/58* (2013.01)

(58) Field of Classification Search

None

See application file for complete search history.

(56) References Cited

U.S. PATENT DOCUMENTS

| | | | |
|---|---|---|---|
| 4,861,159 | A | 8/1989 | Breen |
| 5,825,464 | A | 10/1998 | Feichtner |
| 6,297,878 | B1 | 10/2001 | Miller |
| 6,542,227 | B2 | 4/2003 | Jamieson et al. |
| 6,556,282 | B2 | 4/2003 | Jamieson et al. |
| 6,650,407 | B2 | 11/2003 | Jamieson et al. |
| 6,665,063 | B2 | 12/2003 | Jamieson et al. |
| 7,342,647 | B2 | 3/2008 | McNeely et al. |
| 7,379,166 | B2 | 5/2008 | Meneely et al. |
| 7,400,386 | B2 | 7/2008 | Jamieson et al. |
| 7,580,132 | B2 | 8/2009 | Baillon et al. |
| 7,760,339 | B2 | 7/2010 | Caldwell et al. |
| 7,777,866 | B1 | 8/2010 | Kyrazis |
| 8,072,584 | B2 | 12/2011 | Caldwell et al. |
| 8,508,722 | B2 | 8/2013 | Rogers et al. |
| 8,879,051 | B2 | 11/2014 | Dakin et al. |
| 9,857,145 | B1 | 1/2018 | Rutkiewicz et al. |
| 10,156,473 | B2 | 12/2018 | Lam et al. |
| 10,775,504 | B2 | 9/2020 | Garde et al. |
| 11,169,173 | B2 | 11/2021 | Sly et al. |
| 11,469,571 | B2 | 10/2022 | Huang et al. |
| 2007/0097350 | A1 | 5/2007 | Halama |

(Continued)

OTHER PUBLICATIONS

European Search Report received in EP Application No. 24170092.1, Sep. 25, 2024, 10 pages.

*Primary Examiner* — Eileen M Adams

(74) *Attorney, Agent, or Firm* — Suiter Swantz IP

(57) ABSTRACT

A doppler lidar system includes an acousto-optic modulator. The acousto-optic modulator frequency shifts light to simulate a Doppler effect of a target without moving the target relative to a transceiver. A detector detects a frequency. One or more processors then calibrate the doppler lidar system based on the detected frequency. The acousto-optic modulator is then decoupled to return the doppler lidar system to a normal operating condition. The acousto-optic modulator is coupled in a transmit path or a receive path of the doppler lidar system.

20 Claims, 6 Drawing Sheets

(56) References Cited

U.S. PATENT DOCUMENTS

| | | | | |
|---|---|---|---|---|
| 2011/0222048 | A1* | 9/2011 | Englert | G01S 17/95 356/28.5 |
| 2013/0103317 | A1 | 4/2013 | Ray et al. | |
| 2018/0172720 | A1 | 6/2018 | Miller et al. | |
| 2019/0217966 | A1 | 7/2019 | Winter | |
| 2020/0003900 | A1* | 1/2020 | Stochino | G01S 7/4802 |
| 2021/0381883 | A1 | 12/2021 | Gaitan et al. | |
| 2021/0396884 | A1 | 12/2021 | Peterson et al. | |
| 2021/0405194 | A1* | 12/2021 | Tsuchida | G01S 17/34 |
| 2022/0163556 | A1 | 5/2022 | Naslund et al. | |
| 2022/0365189 | A1 | 11/2022 | Nathan | |
| 2023/0155195 | A1* | 5/2023 | Wiegman | B60L 58/26 429/50 |

* cited by examiner

AOM FREQUENCY SHIFTER TEST FIXTURE

TECHNICAL FIELD

The present invention generally relates to air data systems, and more particularly to air data systems with laser air data sensors generating aircraft air data parameter outputs.

BACKGROUND

Modern aircraft often incorporate air data systems that calculate air data outputs based on measured parameters collected from various sensors positioned about the aircraft. For instance, many air data systems utilize air data probes (e.g., pitot-static probes) that measure pneumatic pressure of airflow about the aircraft exterior to generate aircraft air data outputs, such as aircraft pressure altitude (determined from static pressure measurements), true airspeed, calibrated airspeed, Mach number, angle of attack, angle of sideslip, or other air data parameters.

As aircraft systems such as flight control systems and stall protection systems become more highly integrated, complex, and automated, the accuracy and integrity of air data information used by these aircraft systems becomes increasingly important.

In recent years, the pitot probe technology has proven susceptible to atmospheric icing conditions. The aircraft industry has a desire to have a dissimilar technology to that of the pitot. One such dissimilar technology is a doppler lidar system. The doppler lidar is new and will need ground test equipment to verify its functions. Therefore, it would be advantageous to provide a device, system, and method that cures the shortcomings described above.

SUMMARY

A doppler lidar system is disclosed, in accordance with one or more embodiments of the present disclosure. In some embodiments, the doppler lidar system includes a doppler lidar unit. The doppler lidar unit includes a laser source configured to generate narrowband output light, a detector, and one or more processors. In some embodiments, the doppler lidar system includes an acousto-optic modulator coupled to the laser source. The acousto-optic modulator is configured to generate a frequency-shifted light by frequency shifting the narrowband output light. In some embodiments, the doppler lidar system includes a first transceiver coupled to the acousto-optic modulator. The first transceiver is configured to transmit the frequency-shifted light toward a target and receive a return light from the target. The target is stationary relative to the first transceiver. The frequency shifting by the acousto-optic modulator simulates a Doppler effect of moving the target relative to the first transceiver. The detector is coupled to the first transceiver and configured to receive the return light. The detector detects a frequency of the return light. The one or more processors are configured to execute program instructions causing the one or more processors to calibrate the doppler lidar system based on the frequency of the return light detected the detector.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
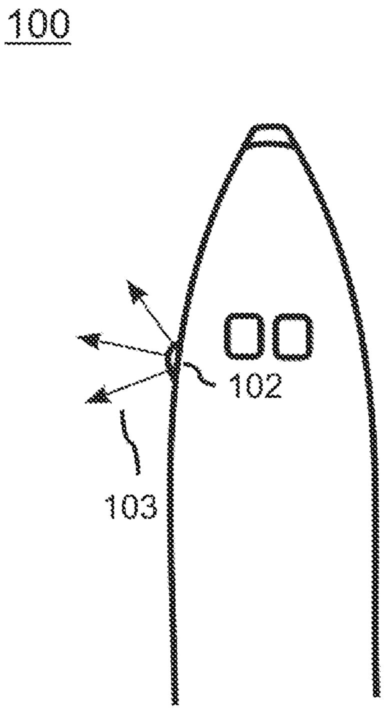
FIG. 1A depicts a top plan view of aircraft, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

U.S. Pat. No. 7,400,386, titled "Combined laser altimeter and ground velocity measurement apparatus", and filed on May 30, 2006; U.S. Pat. No. 2021/0381883, titled "Calibration apparatus and calibrating a laser doppler vibrometer", and filed on Jun. 2, 2021; U.S. Pat. No. 6,542,227, titled "System and method of measuring flow velocity in three axes", and filed on Sep. 4, 2001; U.S. Pat. No. 6,297,878, titled "Non-scanning, three-axis, self-referenced heterodyne laser air data sensing system", and filed on Nov. 13, 1998; U.S. Pat. No. 8,072,584, titled "Optical air data systems and methods", and filed on Jun. 12, 2008; U.S. Patent Publication No. 2018/0172720, titled "Air data system architecture including pneumatic and laser-based sensor measurements", and filed on Dec. 15, 2016; U.S. Patent Publication No. 2019/0217966, titled "Aircraft air data generation using laser sensor data and inertial sensor data", and filed on Jan. 12, 2018; U.S. Pat. No. 11,169,173, titled "Air data system architectures including laser air data and acoustic air data sensors", and filed on May 15, 2019; U.S. Pat. No. 7,379,166, titled "Combined laser altimeter and ground velocity measurement apparatus and a fiber optic filter edge detector of doppler shifts for use therein", and filed on Jan. 11, 2006; U.S. Patent Publication No. 2022/0163556, titled "Laser airspeed measurement sensor incorporating reversion capability", and filed on Nov. 20, 2020; are each incorporated herein by reference in the entirety.

Reference will now be made in detail to the subject matter disclosed, which is illustrated in the accompanying drawings. Embodiments of the present disclosure are generally directed to a doppler lidar system using an acousto-optic modulator to simulate Doppler frequency shift using a stationary target. The doppler lidar system can directly measure the air speed along a line of sight through the doppler shift of the return light from the moving air flow around the system. The acousto-optic modulator is coupled into the doppler lidar system and simulates the Doppler shift without a moving target. The acousto-optic modulator is introduced into the optical transmit path between a laser source and a transceiver. The acousto-optic modulator frequency shifts the outgoing laser light. The frequency-shifted light is emitted by the transceiver, reflected from the stationary target, and received by the transceiver as return light. A detector detects the frequencies of the return light. The frequencies detected by the detector are used by one or more processors for calibration. The acousto-optic modulator is then removed from the optical transmit path to return the doppler lidar system to operational use.

Referring now to FIG. 1A, a top plan view of aircraft 100 is described, in accordance with one or more embodiments of the present disclosure. The aircraft 100 includes a laser air data sensor 102 (LADS). The laser air data sensor 102 is configured to mount to the aircraft 100. In the example depicted, the laser air data sensor 102 is disposed at a first side of the aircraft 100, though in other examples, the laser air data sensor 102 can be disposed at other locations.

The laser air data sensor 102 is a light detection and ranging (LIDAR) sensor (or sensors) configured to emit directional light 103 (e.g., laser light) into the airflow about the exterior of aircraft 100 and to generate aircraft air data parameter outputs based on returns of the emitted directional light, as is further described below. In other examples, laser air data sensor 102 can be and/or include a type of laser light emitter and photodetector that can provide temperature information of the airflow. In such examples, laser air data sensor 102 can provide measured air temperature data.

The laser air data sensor 102 is configured to emit directional light 103 (e.g., laser light). The directional light 103 may be emitted through a window or other optical element into the atmosphere. The directional light 103 may be emitted along three or more axes into the airflow about the exterior of aircraft 100. For instance, as illustrated the laser air data sensor 102 can be configured to emit directional light 103 along three axes into the airflow, though in other examples laser air data sensor 102 can emit directional light 103 along four or more different axes. The three axes (or three of the four of more axes) can, in some examples, be mutually orthogonal, though the three axes need not be mutually orthogonal in all examples. In general, laser air data sensor 102 emits directional light 103 into the airflow along three or more axes that are each angularly separated by a threshold angle (or angles) that enables identification of velocities of the airflow along each of the three or more distinct axes.

The laser air data sensor 102 includes one or more emitting light sources (e.g., lasers) configured to emit the directional light 103 into the airflow along the three or more axes. The light may also be referred to as a laser or a beam. In some examples, laser air data sensor 102 includes a plurality of light sources for emitting the directional light 103, such as one light source for each of the three or more axes. In other examples, laser air data sensor 102 includes a single light source and optical components for emitting directional light 103 from the light source along each of the three or more axes. For example, the optical components may include multiple (e.g., three) transceivers configured to transmit the light into the environment and receive the backscattered returns.

The emitted directional light 103 is reflected off or back-scattered from molecules, aerosols, or other particulates in the air that move with the airflow, known in the art as Mie and Rayleigh scattering. The emitted directional light 103 then returns to the laser air data sensor 102.

The laser air data sensor 102 receives returns of the directional light 103 in each of the three or more axes due to reflection (or scattering) of the emitted directional light 103. The returns are collected by one or more transceivers.

The laser air data sensor 102 includes one or more photodetectors. The photodetectors receive the collected light from the transceivers. The photodetectors are configured to sense the returns of the directional light 103 along each of the three or more axes.

The laser air data sensor 102 thus includes the one or more emitting light sources and the one or more photodetectors. In certain examples, the one or more light sources and/or one or more photodetectors are enclosed within a housing of the laser air data sensor 102. In other examples, the one or more light sources and/or one or more photodetectors are positioned within an electro-optics controller or other device that is optically coupled with laser air data sensor 102 via fiber optic cable or other optical coupling.

Figure 1B:
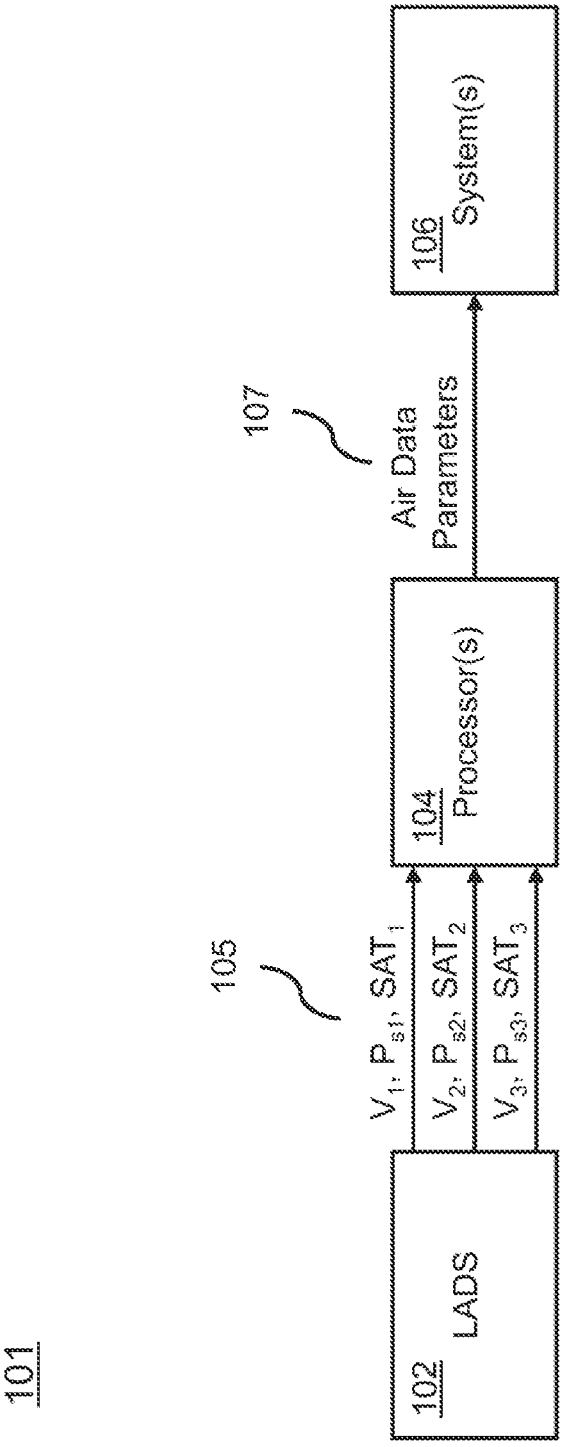
FIG. 1B depicts a simplified block diagram of an air data system of an aircraft, in accordance with one or more embodiments of the present disclosure.

Referring now in particular to FIG. 1B, a simplified block diagram of an air data system 101 of the aircraft 100 is described, in accordance with one or more embodiments of the present disclosure. The air data system 101 includes the laser air data sensor 102, one or more processors 104, and one or more systems 106.

In operation, the laser air data sensor 102 emits directional light 103 in the three separate directions and analyzes backscattered returns (e.g., molecular backscattering). Based on the returns of the emitted directional light 103, laser air data sensor 102 determines a line-of-sight Doppler shift of the emitted directional light along each respective axis. The laser air data sensor 102 determines laser sensor data 105 from the determined Doppler shift. The laser sensor data 105 may include, but is not limited to, static pressure, static air temperature, and velocity information in each direction of the emitted light. The laser air data sensor 102 analyzes the backscattered returns of the emitted light in each of the three separate directions to determine velocity information (V) of the airflow (via the backscattered Doppler shift) as well as static pressure (Ps) and static air temperature (SAT) of the airflow (via a spectral line shape of the molecular scattered returns). In some examples, laser air data sensor 102 can be a molecular-based laser air data sensor that receives returns of emitted directional light off molecules in the air, known in the art as Rayleigh scattering. The molecules have a lower scattering coefficient than the aerosols. In such examples, laser air data sensor 102 can additionally determine, based on the Rayleigh scattering, density information of the air from which laser air data sensor 102 can derive static pressure and static temperature of the airflow about the aircraft exterior.

The processors 104 are electrically and/or communicatively coupled to receive the laser sensor data 105 from the laser air data sensor 102 representative of velocity, static air pressure, and static air temperature. Laser sensor data 105 corresponding to each of the three separate directions of the emitted directional light includes velocity information of the airflow (illustrated as $V_1$, $V_2$, and $V_3$), static pressure of the airflow (illustrated as $Ps_1$, $PS_2$, and $PS_3$), and static air temperature of the airflow (illustrated as $SAT_1$, $SAT_2$, and $SAT_3$).

The processors 104 determine a set of aircraft air data parameter 107 based on the laser sensor data. Examples of air data parameter 107 generated by processors 104 include static air pressure, static air temperature (SAT), aircraft true airspeed (TAS), aircraft angle of attack (AOA), aircraft angle of sideslip (AOS), and/or air data parameters derived therefrom (e.g., aircraft pressure altitude, aircraft Mach number, aircraft calibrated airspeed (CAS), or other air data parameters). Such laser air data sensors typically require three separate directions of emitted laser light to derive the full spectrum of air data parameters 107. In some embodiments, the laser air data sensors 102 may measure the airspeed, the angle of attack, the sideslip, and the like of the aircraft 100.

The processors 104 are electrically coupled to send (and, in some examples, receive) data with one or more systems 106 of the aircraft 100. For example, the processors 104 output the air data parameter 107 to the systems 106. The systems 106 may include, but are not limited to, aircraft flight control systems, flight management computers, auto-flight control systems, standby instrument systems, cockpit displays, data concentrator units, or other systems that utilize air data parameter outputs from for display and/or operational control of the aircraft 100.

The systems 106 use the air data parameter 107 for operational control (e.g., controlled flight) of the aircraft 100, such as controlled flight of the aircraft. For instance, an airspeed of aircraft 100 can be determined based on doppler shift, or frequency difference, between the emitted coherent light pulse and the backscatter light return. Subsequently, the one or more systems 106 may correct the calculated airspeed to a desired airspeed based on one or more engine parameters (e.g., an engine power setting, a rotational speed of a fan of the engine, and a rotational speed of a compressor of the engine) and, in some embodiments, based on one or more aircraft parameters (e.g., pressure altitude, angle of attack, angle of sideslip, and position of aircraft control surfaces).

Figure 2:
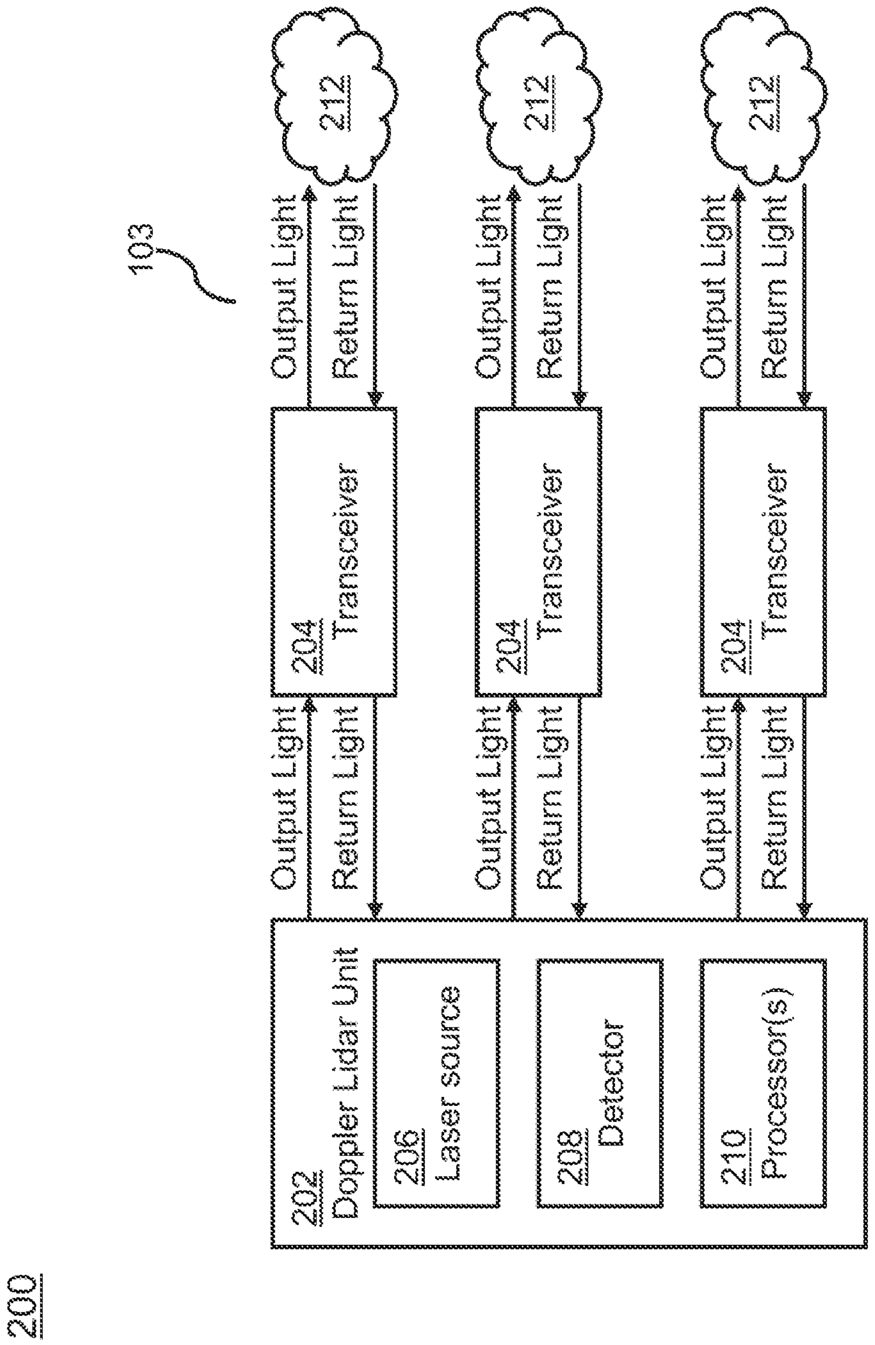
FIG. 2 depicts a simplified block diagram of a doppler lidar system, in accordance with one or more embodiments of the present disclosure.

Referring now to FIG. 2, a doppler lidar system 200 is described, in accordance with one or more embodiments of the present disclosure. The doppler lidar system 200 is an example of the laser air data sensor 102. The doppler lidar system 200 includes one or more components, such as, but not limited to, a doppler lidar unit 202 and one or more transceivers 204.

The doppler lidar system 200 includes the doppler lidar unit 202. The doppler lidar unit 202 may also be referred to as a chassis or a housing. The doppler lidar unit 202 may include one or more components, such as, but not limited to, a laser source 206, a detector 208, and one or more processors 210.

The doppler lidar unit 202 includes the laser source 206. The laser source 206 is a narrowband light source. The laser source 206 is configured to generate a narrowband output light. The laser source 206 may include any laser source configured to generate the narrowband output light such as, but not limited to, a diode laser (e.g., continuous-wave diode laser) and the like. In some embodiments, the laser source 206 may spectrally scan or sweep the frequency of the narrowband output light.

The narrowband output light may include one or more predetermined wavelengths. The predetermined wavelength of the narrowband output light may be in the ultraviolet spectrum, the visible spectrum, and/or the infrared spectrum. For example, the narrowband output light may generally include a wavelength between 200 to 1550 nanometers. For instance, the narrowband output light may include a wavelength of 1064 nm, 1310 nm, 1480 nm, 1550 nm, and the like. Each pulse of the narrowband output light may include a relatively narrowband of frequencies. For example, the narrowband of frequencies may include a frequency of less than 1 MHZ (e.g., 100 kHz or less). The narrowband of frequencies may also be referred to as a linewidth of the narrowband output light. The narrowband output light may be pulsed laser energy or continuous laser energy.

The doppler lidar system 200 also includes the transceivers 204. The transceivers 204 may be considered an optical transceiver. The transceivers 204 may transmit and receive light. The transceivers 204 are coupled to the doppler lidar unit 202. For example, the transceivers 204 may be coupled to the doppler lidar unit 202 by one or more fiber optic cables, free-space coupling, or the like. The transceivers 204 may be coupled to the laser source 206 and/or to the detector 208. In some embodiments, the transceivers 204 are coupled to the laser source 206 of the doppler lidar unit 202. The transceiver 204 receives the narrowband output light from the laser source 206 and emits the narrowband output light into free-space. The transceiver 204 collimates the narrowband output light for transmission into the atmosphere. For example, the transceiver 204 may emit the narrowband output light into the environment surrounding the aircraft 100. The narrowband output light is reflected or backscattered from targets 212 and returns to the transceiver 204 as return light. The targets 212 may include atmospheric constituents such as molecules and aerosols. The return light has a Doppler frequency shift due the relative velocity between the transceiver 204 and the targets 212. For example, the aircraft 100 may be flying at a speed relative to the targets 212. The speed may induce the Doppler shift. The transceiver 204 receives and collects the return light. The transceiver 204 may collimate the return light upon reception.

Each of the transceivers 204 form a line-of-sight emitting the directional light 103. In some embodiments, the doppler lidar system 200 may include three or more lines of sight (LOS) to collect Doppler shifted light along several velocity vectors. The lines of sight may be associated with respective of the transceivers 204. In this regard, the doppler lidar system 200 may include three or more of the transceivers 204.

The doppler lidar unit 202 also includes the detector 208. The detector 208 is coupled to the transceiver 204. The detector 208 is configured to receive the return light from the transceiver 204. The detector 208 converts the return light into electrical signals or digitizes the return light. In particular, the electrical signals indicate the frequency of the return light. For example, the detector 208 may be a gas cell, gas filter cell, an absorption cell, or the like. The gas cell generates a spectrum with peaks indicating the frequency of the return light. The detector 208 may separately detect the frequencies of the return light collected by each of the transceivers 204.

The doppler lidar unit 202 also includes the one or more processors 210. The one or more processors 210 receive the electrical signals indicative of the frequency of the return light. The frequency of the return light may then be compared with the frequency of the output light to determine the Doppler frequency shift and further determine the various laser sensor data 105. Thus, the laser sensor data 105 may be determined for return light received by each of the transceivers 204 and similarly for each of the at least three lines of sight.

Thus, the doppler lidar system 200 depicts a path of light through the various components. The narrowband output light travels from the doppler lidar unit 202 to the transceiver 204, is emitted by the transceiver 204, and is reflected from one or more targets 212 which are moving relative to the transceiver 204. The narrowband output light is not frequency shifted before reflecting from the one or more targets 212. The narrowband output light reflects from the targets 212 as return light to the transceiver 204, is collected by the transceiver 204, and is provided to the detector 208. The return light is frequency shifted due to the relative motion of the targets 212 (i.e., due to the Doppler effect).

The doppler lidar system 200 may experience error. The error contributes to error in determining the Doppler frequency shift and the laser sensor data 105. The error may be caused by one or more error sources in the doppler lidar system 200. In some embodiments, the doppler lidar system 200 may be calibrated using one or more Acceptance Test Procedures (ATP).

One method of calibrating the doppler lidar system 200 is to use spinning targets to perform flight testing or wind tunnel testing. However, using the spinning targets to perform flight testing or wind tunnel testing can be expensive, inconvenient or hazardous to use for the calibration and Acceptance Test Procedures (ATP).

A second method of calibrating the doppler lidar system 200 is described, in accordance with one or more embodiments of the present disclosure. The second method utilizes an acousto-optic modulator 302 as a frequency shifter test fixture. The acousto-optic modulator 302 simulates the Doppler effect of the targets 212 which are moving without having to move the doppler lidar system 200 relative to a target. In this regard, the doppler lidar system 200 may be calibrated without having to perform flight testing or wind tunnel testing.

Figure 3:
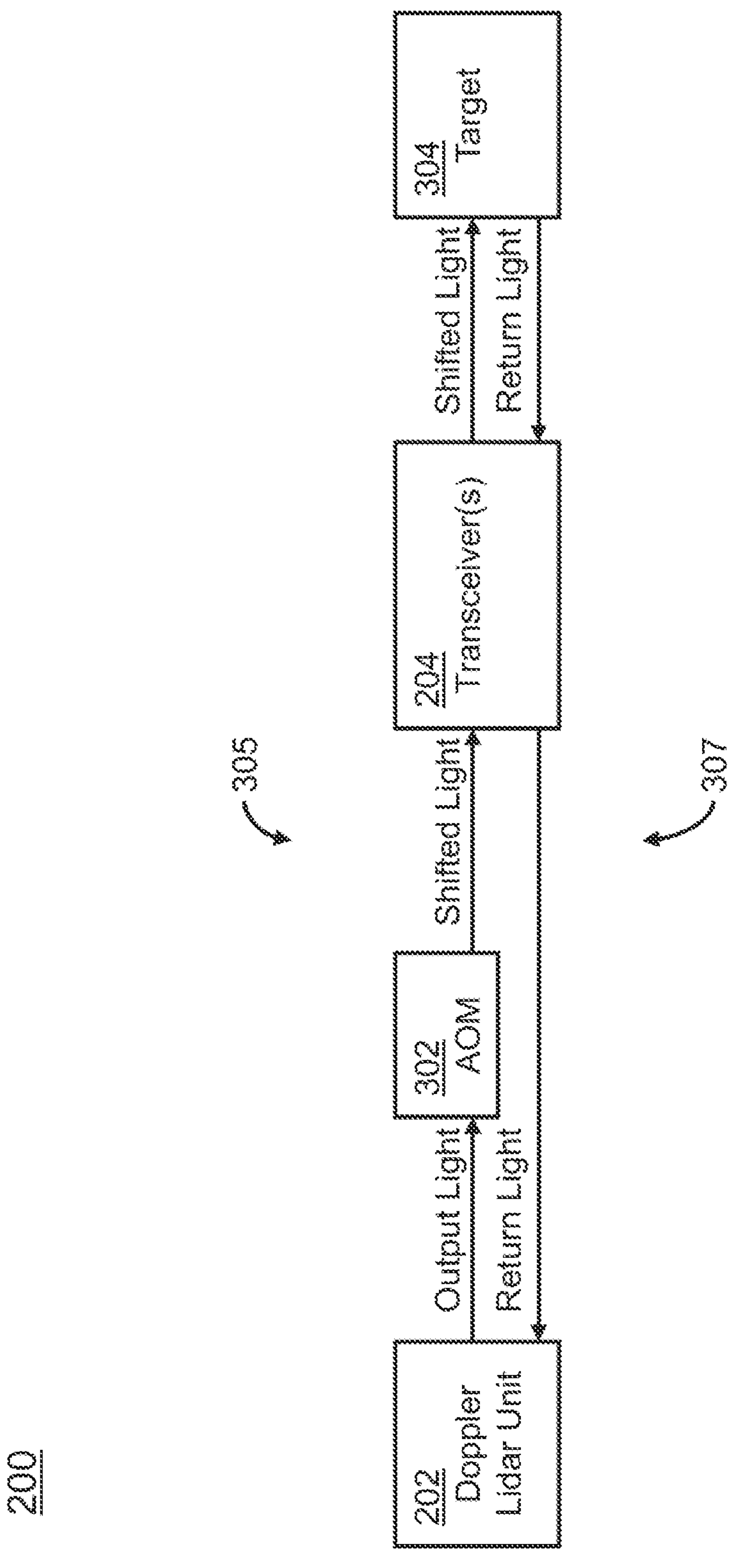
FIG. 3 depicts a simplified block diagram of a doppler lidar system including an acousto-optic modulator, in accordance with one or more embodiments of the present disclosure.

Referring now to FIG. 3, the doppler lidar system 200 is described, in accordance with one or more embodiments of the present disclosure. The doppler lidar system 200 includes an acousto-optic modulator 302 (AOM).

The acousto-optic modulator 302 is coupled between the laser source 206 of the doppler lidar unit 202 and the transceivers 204. The acousto-optic modulator 302 may be coupled to the laser source 206 and/or to the transceivers 204 by a fiber optic coupling, a free-space coupling, and the like.

The acousto-optic modulator 302 is configured to receive the narrowband output light from the laser source 206, frequency shift the narrowband output light, and output a frequency-shifted light. The narrowband output light is frequency shifted to generate the narrowband output light. The acousto-optic modulator 302 is configured to frequency shift the narrowband output light by a predetermined frequency to generate the frequency-shifted light. The predetermined frequency may be based on a configuration of the acousto-optic modulator 302. In some embodiments, the predetermined frequency may be on the order of an 80 MHz frequency shift up to several hundred MHZ (e.g., three hundred to four-hundred MHz).

The transceiver 204 is coupled to the acousto-optic modulator 302. The transceiver 204 is configured to receive the frequency-shifted light and transmit the frequency-shifted light toward a target 304. The frequency-shifted light is then reflected or backscattered from the target 304 to the transceiver 204 as return light. The detector 208 of the doppler lidar unit 202 then receives the return light from the transceiver 204.

The target 304 may include a hard target or a soft target. For example, the soft targets may include aerosols, molecules, clouds, stationary air masses, and the like. The return light may then include molecular and/or aerosol scatter return light. It is contemplated that reflected returns from the hard target reflected returns may not properly simulate the return light from the atmospheric aerosols and molecules because returns from aerosol and molecules are broadened by random motion of the aerosol and molecules in the atmosphere.

The target 304 is a stationary target. Stationary refers to no apparent motion of the target 304 relative to the transceiver 204. As may be understood the individual aerosols and/or molecules of the target 304 may vibrate or move due to kinetic energy. However, the relative speed of the target 304 on a macroscopic scale while stationary is zero. In this regard, the target 304 which is stationary induces no frequency shift due to the Doppler effect.

The frequency shift of the transmit light causes the same frequency shift in the return light. The return light is frequency shifted due to the frequency shift induced by the acousto-optic modulator 302. The frequency of the return light is based on the frequency of the narrowband output light and the frequency shifting of the acousto-optic modulator 302. The return light is not frequency shifted due to the Doppler effect because the target 304 is stationary relative to the transceiver 204.

The frequency shifting by the acousto-optic modulator 302 simulates the Doppler effect of moving the target 212 relative to the doppler lidar system 200. In some embodiments, the predetermined frequency shift of the acousto-optic modulator 302 simulates the effect of air flowing around the aircraft 100.

The processors 210 receive the signals indicative of the frequency of the return light detected by the detector 208. The processors 210 are configured to execute program instructions causing the processors 210 to calibrate the doppler lidar system 200 based on the frequency of the return light detected by the detector 208. The frequency of the laser source 206 and the frequency shifting by the acousto-optic modulator 302 is known by the processors 210. The processors 210 may determine an expected frequency based on the frequency of the laser source 206 and the frequency shift of the acousto-optic modulator 302. The processors 210 may compare the expected frequency with the frequency of the return light to determine an error. The error may be associated with any of the laser source 206, the transceiver 204, and/or the detector 208. The processors 210 may then calibrate for the error. For example, the processors 210 may calibrate a line-of-sight (LOS) velocity during a production environment. The production environment may be when the acousto-optic modulator 302 is decoupled and the doppler lidar unit 202 is coupled to the transceiver 204. The calibration may be considered one or more steps in an Acceptance Test Procedure (ATP) of the doppler lidar system 200.

Advantageously, the acousto-optic modulator 302 allows for calibrating the doppler lidar system 200 without a moving target, such as without a spinning target or moving aerosols in a wind tunnel. Instead, the acousto-optic modulator 302 introduces the frequency shift.

Thus, the doppler lidar system 200 depicts a path of light through the various component. The narrowband output light travels from the laser source 206 through fiber to the acousto-optic modulator 302, is frequency-shifted, and travels through fiber to the transceiver 204. The transceiver 204 emits the frequency-shifted light. The frequency-shifted light is reflected off the target 304 back to the transceiver 204 as return light. The transceiver 204 receives and collects the return light. The return light travels through fiber to the detector 208.

In some embodiments, the acousto-optic modulator 302 is coupled between the laser source 206 of the doppler lidar unit 202 and the transceiver 204 in a transmit channel or a transmit path 305 of the doppler lidar system 200. The transmit path 305 is formed by the laser source 206, the acousto-optic modulator 302, and the transceiver 204. A receive path 307 is formed by the transceiver 204 and the detector 208.

In some embodiments, the narrowband output light and the frequency-shifted light are maintained on the transmit path 305. The return light is maintained on the receive path 307. The narrowband output light and the frequency-shifted light are not mixed with the return light. In this regard, the system 200 does not heterodyne the narrowband output light and/or the frequency-shifted light with the return light.

The acousto-optic modulator 302 may also be referred to as a frequency-shifter test fixture. In some embodiments, the acousto-optic modulator 302 is configured to decouple from the laser source 206 and the transceivers 204. The laser source is configured to decouple from the acousto-optic modulator and then couple to the transceivers 204. The transceivers 204 are then configured to transmit the narrowband output light when the laser source 206 is coupled to the transceivers 204. For example, this configuration may be similar to the depiction in FIG. 2. The doppler lidar system 200 may then be the laser air data sensor 102 configured to measure airspeed, angle of attack, and sideslip of the aircraft 100 when the laser source 206 is coupled to the transceivers 204.

Figure 4:
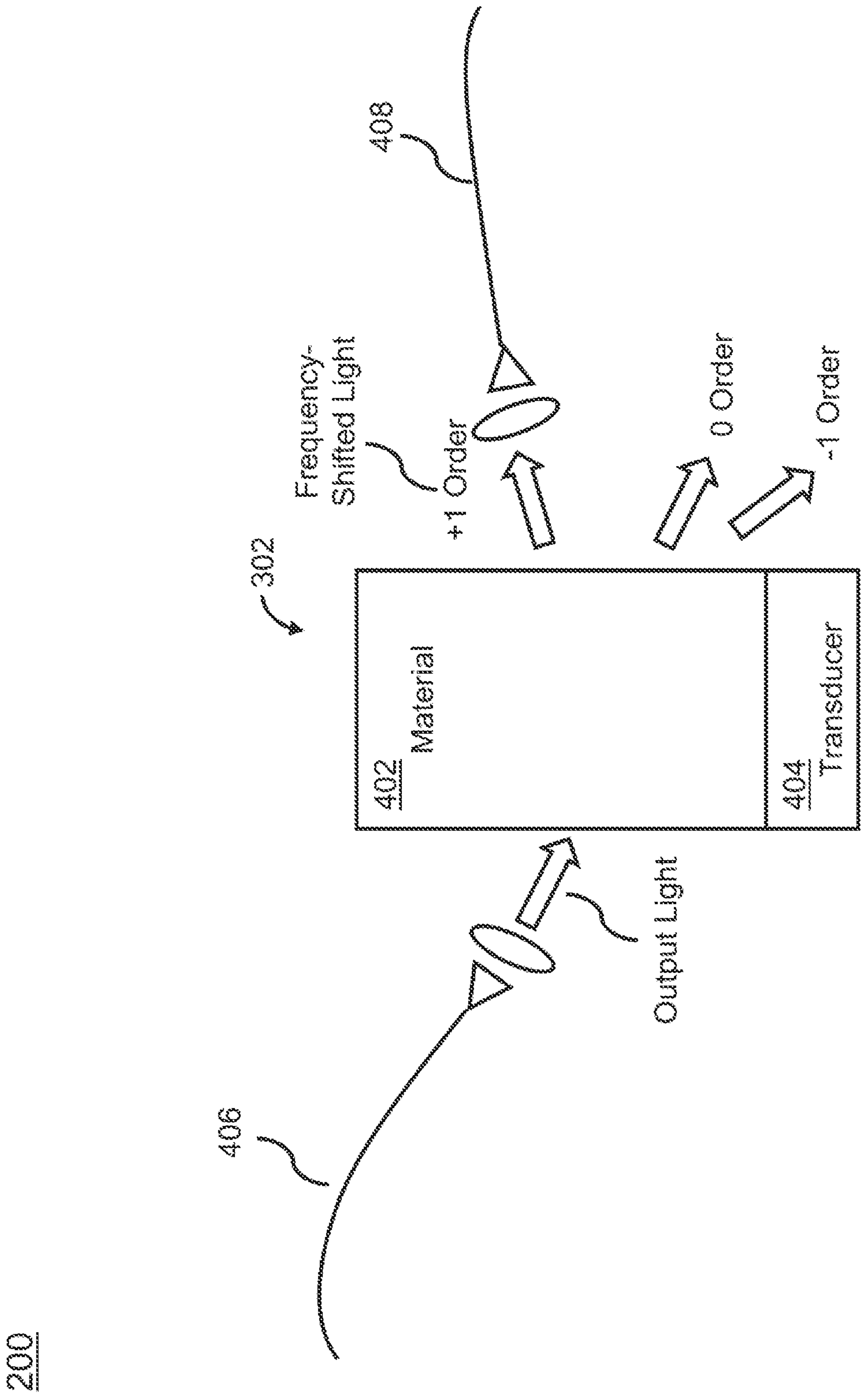
FIG. 4 depicts an acousto-optic modulator frequency shifting a narrowband output light to generate frequency-shifted light, in accordance with one or more embodiments of the present disclosure.

Referring now to FIG. 4, the acousto-optic modulator 302 is described, in accordance with one or more embodiments of the present disclosure. The acousto-optic modulator 302 includes a material 402 and a transducer 404.

The acousto-optic modulator 302 receives the narrowband output light from the laser source 206. In this example, the acousto-optic modulator 302 is coupled to the laser source 206 by an optic fiber 406. This is not intended as a limitation. The acousto-optic modulator 302 may also be free-spaced coupled to the laser source 206.

The material 402 may include glass, quartz, crystal, or the like. The acousto-optic modulator 302 creates period variation in the refractive index of the material 402 through acoustic waves generate by the transducer 404. The transducer 404 may modulate the acoustic waves by an RF input signal. The acoustic waves travel in the material 402 to form a periodic refractive index variation along the material 402. The material 402 is then used as a diffraction grating. The narrowband output light passes through the material. The period variation in the refractive index of the material 402 cause the collimated beam of narrow band wavelength to diffract into various spectral orders. The acousto-optic modulator 302 deflects the narrowband output light into multiple diffraction orders and shift the frequency of the input beam depending on the order. As depicted, the light is deflected into −1 order, 0 order, and +1 order, although this is not intended to be limiting. The acousto-optic modulator outputs light divided into the various constructive interference orders. In addition to the beam deflection, the +1 order output beam is shifted in frequency. In this example, the +1 order output beam is selected as the frequency-shifted light. It is further contemplated that the frequency-shifted light may be selected from any order other than zero, as the zero order won't experience a frequency shift. However, the +1 order may be desirable as the +1 order experiences a highest output power.

The acousto-optic modulator 302 thus generates the frequency-shifted light by frequency shifting the narrowband output light. The transceiver 204 then receives the frequency-shifted light from the acousto-optic modulator 302. In this example, the transceiver 204 is coupled to the acousto-optic modulator 302 by an optic fiber 408. This is not intended as a limitation. The transceiver 204 may also be free-spaced coupled to the acousto-optic modulator 302.

Figure 5:
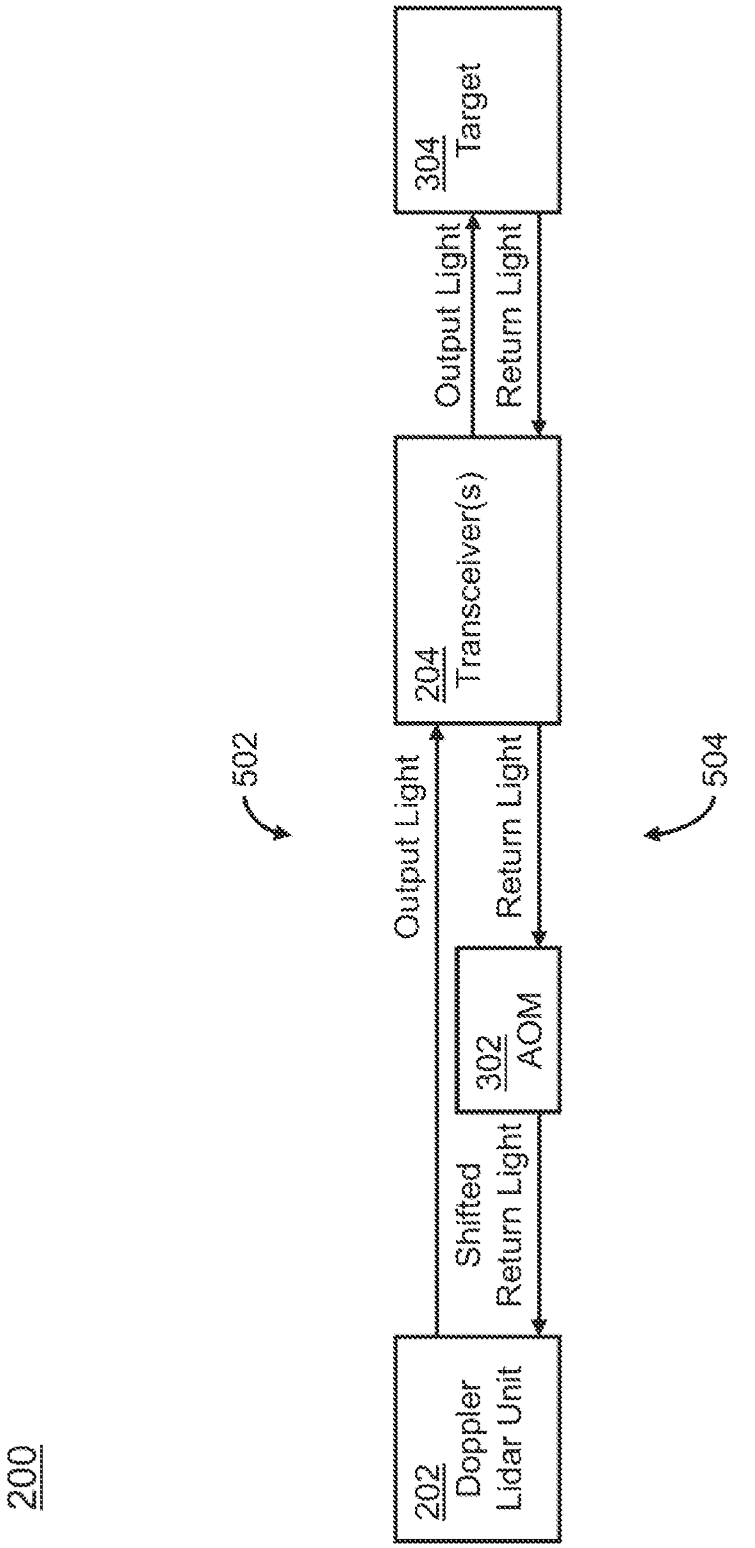
FIG. 5 depicts a simplified block diagram of a doppler lidar system including an acousto-optic modulator in a receive path, in accordance with one or more embodiments of the present disclosure.

Referring now to FIG. 5, the doppler lidar system 200 is described, in accordance with one or more embodiments. Although the acousto-optic modulator 302 has been described as being coupled between the laser source 206 and the transceiver 204 in the transmit path 305, this is not intended as a limitation of the present disclosure. In some embodiments, the acousto-optic modulator 302 may be coupled between the detector 208 of the doppler lidar unit 202 and the transceiver 204 in a receive channel or a receive path 504 of the doppler lidar system 200. The receive path 504 is formed by the transceiver 204, the acousto-optic modulator 302, and the detector 208. A transmit path 502 is formed by the laser source 206 and the transceiver 204.

In this example, the transceiver 204 receives the narrowband output light from the laser source 206 and transmits the narrowband output light. The narrowband output light is transmitted toward target 304. The return light is reflected or backscattered from the target 304.

The transceiver 204 also receives the return light. In this example, the return light has not yet been frequency shifted.

Rather, the frequency of the return light is the frequency of the narrowband output light. The acousto-optic modulator 302 is coupled to the transceiver 204 and receives the return light. The acousto-optic modulator 302 generates a frequency-shifted return light by frequency shifting the return light. The frequency of the frequency-shifted return light is based on the frequency of the return light and the frequency shifting of the acousto-optic modulator 302. The frequency-shifted return light is first order light transmitted through the acousto-optic modulator 302.

The detector 208 is coupled to the acousto-optic modulator 302 and is configured to receive the frequency-shifted return light. The detector detects a frequency of the frequency-shifted return light. The processors 210 then execute program instructions causing the processors 210 to calibrate the doppler lidar system 200 based on the frequency of the frequency-shifted return light detected the detector 208.

The narrowband output light is maintained on the transmit path 502. The return light and the frequency-shifted return light is maintained on the receive path 504. The narrowband output light is not mixed with the return light and the frequency-shifted return light. In this regard, the system 200 does not heterodyne the narrowband output light with the return light and/or the frequency-shifted return light.

In some embodiments, the acousto-optic modulator 302 is configured to decouple from the transceivers 204 and the detector 208. The transceiver 204 is configured to decouple from the acousto-optic modulator 302 and then couple to the detector 208. The detector 208 is then configured to receive the return light when coupled to the transceiver 204. For example, this configuration may be similar the depiction in FIG. 2.

Although the doppler lidar system 200 is described as placing the acousto-optic modulator 302 in the receive path 307, this is not intended as a limitation of the present disclosure. It is desirable to place the acousto-optic modulator 302 in the transmit path 305. For example, the optical fibers for the transmit path 305 have a smaller beam diameter than the optical fiber for the receive path 305. Additionally, the beam size in the transmit path 305 is smaller. The acousto-optic modulator 302 is more efficient for the smaller beam sizes. In this regard, the configuration depicted in FIG. 3 may be desirable over the configuration depicted in FIG. 5.

Referring generally again to FIGS. 1-5. The laser air data sensor 102 may be low profile (e.g., disposed flush with the skin of the aircraft 100). The low profile can help to reduce both drag on the aircraft 100 and susceptibility of the laser air data sensor 102 to failure modes associated with icing conditions.

In some embodiments, the laser air data sensor 102 and processors 104 can be enclosed within a single electronics housing that forms a single line replaceable unit (LRU) or distributed among multiple LRUs that are electrically and/or communicatively connected. The processors 104 can be incorporated into the laser air data sensor 102, be located a LRU that is electrically and/or communicatively coupled with the laser air data sensor 102, or distributed among any one or more of laser air data sensor 102 and various LRUs.

In some embodiments, the acousto-optic modulator 302 may be coupled between the doppler lidar unit 202 and each of the transceivers 204. For example, the doppler lidar system 200 may include a fiber optic switch coupled between the acousto-optic modulator 302 and each of the transceivers 204. The fiber optic switch may switch between each of the transceivers 204 for calibration. It is further contemplated that the acousto-optic modulator 302 may be manually coupled and uncoupled to respective of the transceivers 204.

In some embodiments, the doppler lidar system 200 may include multiple of the acousto-optic modulators 302 each having a different predefined frequency shift. The doppler lidar system 200 may switch between the acousto-optic modulators 302 to verify the frequency shifts and similar verify the accuracy at different speed of the aircraft 100. For example, the doppler lidar system 200 may include a first fiber optic switch coupled between the doppler lidar unit 202 and the acousto-optic modulators 302 and a second fiber optic switch coupled between the acousto-optic modulators 302 and the transceivers 204.

While the example has been described with respect to one laser air data sensor 102, techniques of this disclosure are not so limited. For instance, in some examples, the air data system architecture can include multiple (e.g., two or more) laser air data sensors to provide further redundancy of air data parameter outputs.

As may be understood, any of the various components may be optically coupled by one or more optical connectors. The optical connectors may include any suitable optical fiber connectors to join optical fibers, such as, but not limited to, pigtails, patch cords, and the like. The optical connectors are not depicted in the interest of clarity. Additionally, any of the various components may be coupled by optical fiber fusion splicing, butt coupling, or positioning using free space optics.

Electrical couplings can take the form of direct electrical couplings and/or data bus couplings configured to communicate according to one or more communication protocols, such as the Aeronautical Radio, Incorporated (ARINC) 429 communication protocol, controller area network (CAN) bus communication protocol, military standard 1553 (MIL-STD-1553) communication protocol, or other analog or digital communication protocols.

A network interface may include any suitable network interface for interfacing with the network bus, such as, but not limited to, a wired or a wireless network interface. The network interface may include mechanical, electrical, or signaling circuitry for communicating data to and from the network and subsequently to various other nodes. The network interface may be configured to receive various input signals and transmit various output signals. The network interface may be communicatively coupled to various other network interfaces over a network bus. The network interface may wirelessly communicate with the network bus (e.g., via one or more radio signals).

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more programs running on one or more controllers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A doppler lidar system comprising:

a doppler lidar unit comprising:

a laser source that generates a narrowband output light;

a detector; and one or more processors;

an acousto-optic modulator coupled to the laser source; wherein the acousto-optic modulator generates a frequency-shifted light by frequency shifting the narrowband output light; and a first transceiver coupled to the acousto-optic modulator; wherein the first transceiver transmits the frequency-shifted light and receives a return light; wherein the frequency shifting of the narrowband output light by the acousto-optic modulator simulates a Doppler effect;

wherein the detector is coupled to the first transceiver and receives the return light; wherein the detector detects a frequency of the return light;

wherein the one or more processors are configured to execute program instructions causing the one or more processors to calibrate the doppler lidar system based on the frequency of the return light detected by the detector.

2. The doppler lidar system of claim 1, wherein a transmit path is formed by the laser source, the acousto-optic modulator, and the first transceiver; wherein a receive path is formed by the first transceiver and the detector; wherein the narrowband output light and the frequency-shifted light are maintained on the transmit path; wherein the return light is maintained on the receive path; wherein the narrowband output light and the frequency-shifted light are not mixed with the return light.

3. The doppler lidar system of claim 1, wherein the frequency of the return light is based on a frequency of the narrowband output light and the frequency shifting of the acousto-optic modulator.

4. The doppler lidar system of claim 1, wherein the frequency-shifted light is first order light transmitted through the acousto-optic modulator.

5. The doppler lidar system of claim 1, wherein the laser source is configured to decouple from the acousto-optic modulator and couple to the first transceiver; wherein the first transceiver is configured to transmit the narrowband output light when the laser source is coupled to the first transceiver.

6. The doppler lidar system of claim 5, comprising at least the first transceiver, a second transceiver, and a third transceiver.

7. The doppler lidar system of claim 6, wherein the doppler lidar system is a laser air data sensor configured to mount to an aircraft; wherein the laser air data sensor is configured to measure an airspeed, an angle of attack, and a sideslip of the aircraft when the laser source is coupled to the first transceiver.

8. The doppler lidar system of claim 1, wherein the first transceiver is configured to transmit the frequency-shifted light toward a target and receive the return light from the target; wherein the target is stationary relative to the first transceiver; wherein the frequency shifting of the narrowband output light by the acousto-optic modulator simulates the Doppler effect of moving the target relative to the first transceiver.

9. The doppler lidar system of claim 8, wherein the return light is configured to backscatter from the target; wherein the target comprises one of a hard target, an aerosol, or atmospheric molecules.

10. The doppler lidar system of claim 1, wherein the acousto-optic modulator is one of fiber-coupled or free-space coupled to the laser source.

11. The doppler lidar system of claim 1, wherein the first transceiver is one of fiber-coupled or free-space coupled to the acousto-optic modulator.

12. The doppler lidar system of claim 1, wherein the detector is a gas cell.

13. The doppler lidar system of claim 1, wherein the program instructions cause the one or more processors to calibrate a line-of-sight velocity of the doppler lidar system based on the frequency of the return light detected by the detector.

14. A doppler lidar system comprising:

a doppler lidar unit comprising:

a laser source that generates a narrowband output light;

a detector; and one or more processors;

a first transceiver coupled to the laser source; wherein the first transceiver transmits the narrowband output light and receives a return light; and an acousto-optic modulator coupled to the first transceiver; wherein the acousto-optic modulator generates a frequency-shifted return light by frequency shifting the return light; wherein the frequency shifting of the return light by the acousto-optic modulator simulates a Doppler effect;

wherein the detector is coupled to the first transceiver and receives the frequency-shifted return light; wherein the detector detects a frequency of the frequency-shifted return light;

wherein the one or more processors are configured to execute program instructions causing the one or more processors to calibrate the doppler lidar system based on the frequency of the frequency-shifted return light detected by the detector.

15. The doppler lidar system of claim 14, wherein a transmit path is formed by the laser source and the first transceiver; wherein a receive path is formed by the first transceiver, the acousto-optic modulator, and the detector; wherein the narrowband output light is maintained on the transmit path; wherein the return light and the frequency-shifted return light is maintained on the receive path; wherein the narrowband output light is not mixed with the return light and the frequency-shifted return light.

16. The doppler lidar system of claim 14, wherein a frequency of the return light is a frequency of the narrowband output light.

17. The doppler lidar system of claim 16, wherein the frequency of the frequency-shifted return light is based on the frequency of the return light and the frequency shifting of the acousto-optic modulator.

18. The doppler lidar system of claim 14, wherein the frequency-shifted return light is first order light transmitted through the acousto-optic modulator.

19. The doppler lidar system of claim 14, wherein the first transceiver is configured to decouple from the acousto-optic modulator and couple to the detector; wherein the detector is configured to receive the return light when coupled to the first transceiver.

20. The doppler lidar system of claim 14, wherein the first transceiver is configured to transmit the narrowband output light toward a target and receive the return light from the target; wherein the target is stationary relative to the first transceiver; wherein the frequency shifting of the narrowband output light by the acousto-optic modulator simulates the Doppler effect of moving the target relative to the first transceiver.

* * * * *